M. GOERMAN.
ATTACHMENT FOR TROLLEY WHEELS.
APPLICATION FILED JAN. 18, 1911.

1,031,256.

Patented July 2, 1912.

WITNESSES

INVENTOR.
Michael Goerman
by his Attorney

UNITED STATES PATENT OFFICE.

MICHAEL GOERMAN, OF MANORVILLE, PENNSYLVANIA, ASSIGNOR OF ONE-THIRD TO JAMES E. CALLEN, OF FORD CITY, PENNSYLVANIA.

ATTACHMENT FOR TROLLEY-WHEELS.

1,031,256. Specification of Letters Patent. Patented July 2, 1912.

Application filed January 18, 1911. Serial No. 603,222.

*To all whom it may concern:*

Be it known that I, MICHAEL GOERMAN, a citizen of the United States, residing at Manorville, in the county of Armstrong and State of Pennsylvania, have invented certain new and useful Improvements in Attachments for Trolley-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved attachment for trolley wheels, and it has for its object, a means for preventing said trolley wheel from accidentally leaving the line wire, and the invention consists in the certain details of construction and combination of parts, as will be fully described hereinafter.

Figure 1:
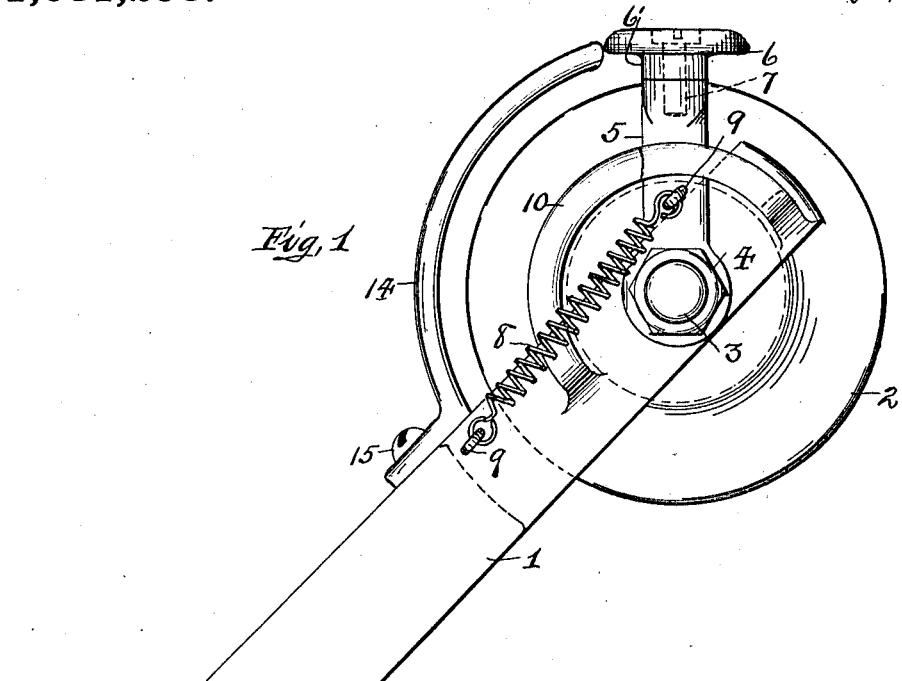
Figure 2:
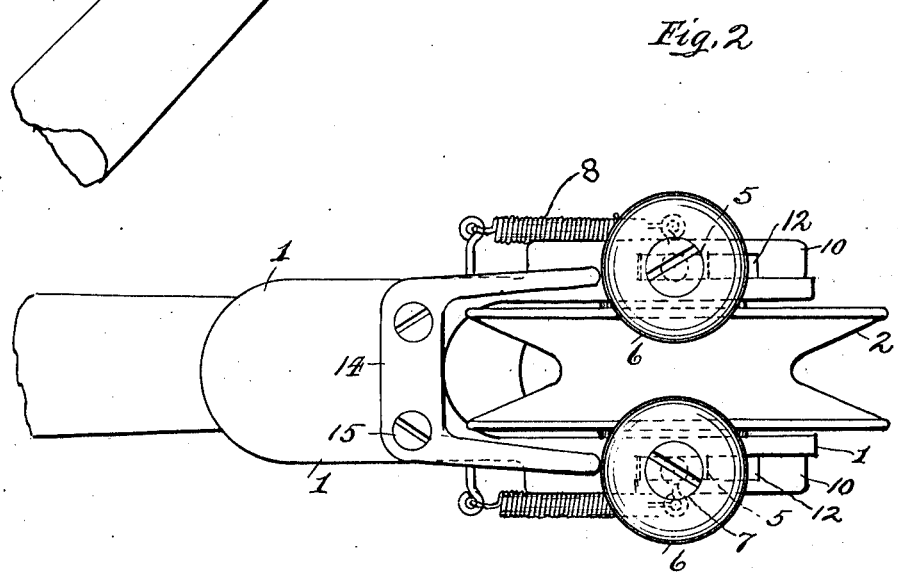

In the accompanying drawings;—Figure 1 is a side elevation of my improved attachment, the same being constructed and arranged in accordance with my invention. Fig. 2 is a plan view of the same.

To construct an attachment or guard for trolley wheels in accordance with my invention, and attach the same to the ordinary yoke 1, carrying the trolley wheel, 2, I arrange at either side of the shaft 3, and mounted thereon, standards 5, each carrying at the top loosely mounted undercut rollers 6. These standards are loosely mounted on the shaft 3 and held in position by the nuts 4. The rollers 6 are undercut, as at 6', and project some distance over the trolley wheel 2, and are held in position by screws 5, as will be best seen by reference to Fig. 1 of the drawings.

Attached to or formed integral with the yoke 1, are semi-circular guide pieces 10, having slots 12, which inclose the standards 5, and limit their back and forward movement. Connected to each of the standards 5, by means of pins or eyes 9, are spiral springs 8, which tend to keep the standards 5 in an upright position. At the front of the trolley wheel 2, and attached to the yoke 1, is a curved or bent fork 14, which leads upward to points near but out of contact with the under-cut rollers 6, as a further protection in preventing the trolley wheel from accidentally leaving the trolley wire.

During the rapid movement of the trolley wheel along the line wire, any uneven part of the track or any interruption on said wire, causes the trolley pole to vibrate, giving the trolley wheel a jumping motion, causing the said wheel to frequently leave the line wire. By the use of the above-described attachment it is almost impossible for the trolley to leave the line wire, as the line wire will be caught under the overhanging portions of the rollers, giving the spring-actuated trolley pole an opportunity to force the wheel upward and re-seat the line wire. The spiral springs 8, will permit the rollers 6 to move backward should they meet with any obstruction, and when the obstruction has been passed, bring said rollers back to their normal position.

Various slight modifications and changes may be made in the details of construction without departing from the spirit of the invention. Therefore I do not wish to confine myself to the exact construction, shown and described.

Having thus described my invention, what I claim, and desire to secure by Letters Patent, is:—

The herein-described trolley wheel mechanism, comprising a trolley pole, yoke and wheel, standards journaled to the shaft and at either side of said wheel, suitable semi-circular guides attached to said yoke, said guides having slots in which said standards are inclosed to limit the movement of the standards in either direction, rollers loosely mounted upon the tops of the standards, said rollers having integral flanges which overhang said trolley wheel, means comprising springs for exerting tension upon said standards in one direction, and a fork attached to the yoke and leading to the rollers, substantially as described.

In testimony whereof, I affix my signature, in presence of two witnesses.

his
MICHAEL × GOERMAN.
mark

Witnesses:
H. H. HAILMAN,
J. F. McNUTT.

Copies of this patent may be obtained for five cents each, by addressing the "Commissioner of Patents, Washington, D. C."